United States Patent

[11] 3,573,468

| [72] | Inventor | Karl Lang<br>Atzbach, Kreis Wetzlar, Germany |
| --- | --- | --- |
| [21] | Appl. No. | 866,845 |
| [22] | Filed | Oct. 16, 1969 |
| [45] | Patented | Apr. 6, 1971 |
| [73] | Assignee | Ernst Leitz G.m.b.H.<br>Wetzlar, Germany |
| [32] | Priority | Oct. 19, 1968 |
| [33] | | Germany |
| [31] | | P 18 04 028.3 |

[54] PHOTOELECTRIC INCREMENTAL TRANSDUCER FOR 4-PHASE SIGNALS COMPRISING MEANS FOR GEOMETRICALLY SPLITTING THE LIGHT BEAMS
5 Claims, 4 Drawing Figs.

[52] U.S. Cl. ............................................. 250/209,
250/220, 250/231, 250/237
[51] Int. Cl. ............................................. H01j 3/14,
H01j 39/12, G01d 5/34
[50] Field of Search............................................. 250/209,
210, 220, 237, 231

[56] References Cited
UNITED STATES PATENTS

| 3,421,011 | 1/1969 | Hock..................... | 250/210X |
| 3,489,908 | 1/1970 | Hock et al. ............. | 250/220X |

*Primary Examiner*—James W. Lawrence
*Assistant Examiner*—T. N. Grigsby
*Attorney*—Krafft & Wells

ABSTRACT: In a photoelectric incremental transducer wherein the grating is reproduced after a polarizing image splitting step, either onto a second grating or onto itself and indexing images are reproduced thereafter by way of a polarizing splitter and position-defining signals are obtained at at least two photoelectric receivers, the improvement comprising the insertion of a geometric splitter which produces an image shift of one-half a graduation interval in the image beam path behind the place of reproduction in the plane conjugate with respect to the geometric splitter, and means are provided for the separate reception of the different beams.

Patented April 6, 1971

INVENTOR
KARL LANG

Krafft & Wells
ATTORNEYS

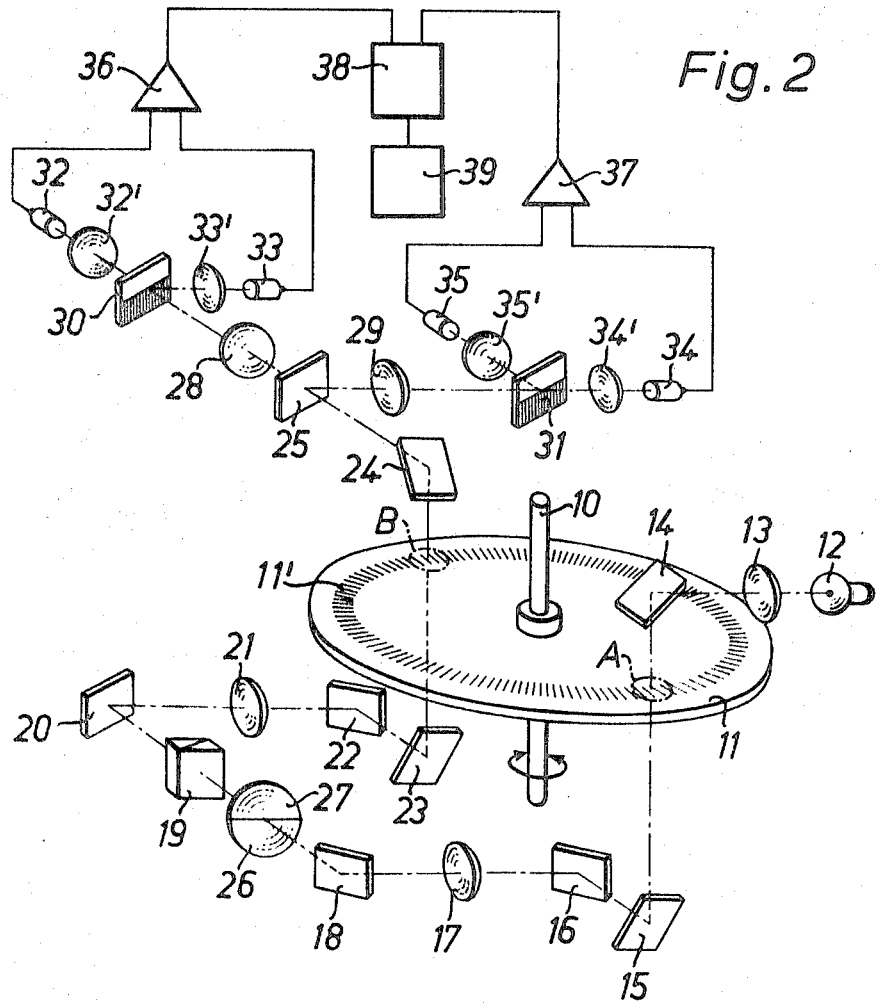

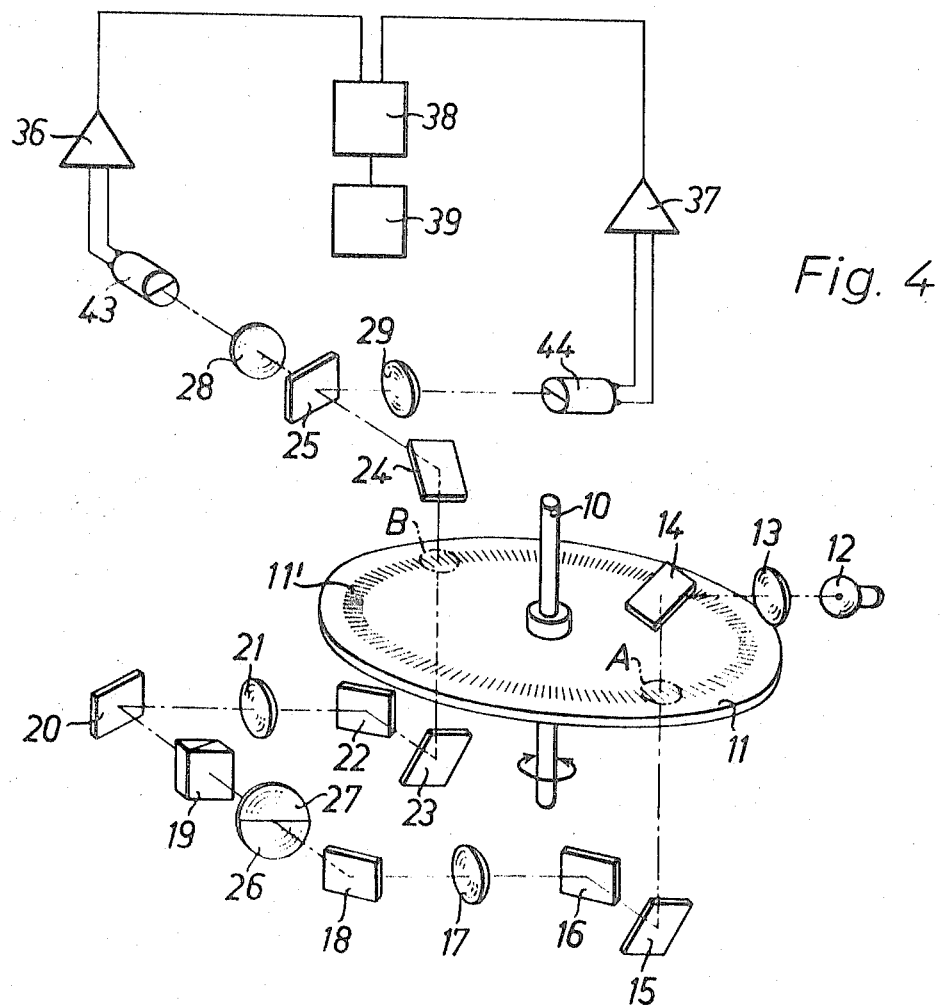

3,573,468

PHOTOELECTRIC INCREMENTAL TRANSDUCER FOR 4-PHASE SIGNALS COMPRISING MEANS FOR GEOMETRICALLY SPLITTING THE LIGHT BEAMS

CROSS REFERENCES TO RELATED APPLICATIONS

Applicant claims priority under 35 U.S.C. 119 for Application P 18 04 028.3, filed Oct. 18, 1968, in the Patent Office of the Federal Republic of Germany.

Applicant incorporates by reference application, Ser. No. 801,229 of Fromund Hock and Knut Heitman, filed Feb. 3, 1969 and having the title "Photoelectric Incremental Transducer Having Fine Measuring Device." The application of Hock et al. discloses the equivalence of radial incremental transducers and linear transducers and shows in more detail the electronic components for recording measurements.

BACKGROUND OF THE INVENTION

1. Field of the Invention

The invention relates to a measuring apparatus for determining the length or an angle of an object. More specifically, the invention relates to a measuring device which comprises a light source, an optical system, a grating which is displaceable relative to said optical system, and photoelectric receivers. By the displacement of said grating—which may be a linear or a rotary motion—the light flux is caused to vary periodically which variations are converted to photoelectric current fluctuations and may be used in electronic counting techniques or analogous evaluations.

2. Description of the Prior Art

Measuring devices of the above-described type are known to those skilled in this particular art as photoelectric incremental transducers. They may be used for measuring the extent of the motion of the grating relative to an object, thereby defining the length of said object. According to the same principle an angle may be measured or the angular position of an object may be determined by a device commonly called an incremental angle transducer, wherein the grating is a disc having radially extending lines and wherein the motion of the grating is a rotatory one.

From the photoelectric receivers a pulsating DC current is obtained which may be considered to consist of a DC level superimposed by an AC current. This DC level, however, is not constant. Owing to variations in the average light flux between light source and receiver which may be caused by light source aging or by varying transmission properties of the optical parts as may be caused by dust particles, etc., the DC level of the signals shifts proportional to this influence. Since in most embodiments of incremental transducers this DC level is related to a trigger level, the trigger points therefore also do shift, thereby introducing measuring errors.

In order to eliminate the shifting of this average DC level it is already known in the art to generate additional signals which are counterphased to the position-defining signals and to supply position-defining signals and counterphased signals to push-pull amplifiers with common mode rejection.

When the amplification ratio has been set accurately, the DC portions cancel each other out, whereas the AC proportions are added up in phase.

Thus, if it is desired to eliminate, in a photoelectric incremental transducer, the interfering DC proportions from the measuring signals, a total of four signals is thus required, respectively two of which are in mutual phase opposition. The DC proportions are preferably resultant on the carrier proportion of the light energy amplitude-modulated by the grating.

The problem faced by applicant is therefore to provide a photoelectric incremental transducer which is as simple as possible, and with the aid of which the necessary signals can be obtained so that a four-phase rotating field is produced.

The state of the art of incremental transducers is illustrated in U.S. Pat. No. 3,421,011 of Fromund Hock, issued Jan. 7, 1969.

SUMMARY OF THE INVENTION

The invention relates to a photoelectric incremental transducer wherein the grating employed is reproduced, after a polarizing image splitting step, either onto another grating or onto itself, and wherein, by way of a polarizing splitter, at least two photoelectric receivers are connected after the image site, for the production of position-defining signals. The incremental transducer of the present invention is distinguished by the feature that, additionally, a geometrical splitter is inserted in the image beam path, which splitter produces an image shift by one-half an index interval, and that means are provided behind the image site in a plane conjugate with respect to the splitter, which means serve for the separate reception of the different partial image beams.

It is, of course, possible to employ also different geometric beam splitters in place of the half-lenses offset with respect to each other with their central axes. Examples in this connection are an optical wedge or two plane-parallel plates, each of which picks up the image beam only partially. Beam splitters of such nature are already known per se, as for example shown in "Die Fernrohre und Entfernungsmesser" by Albert Koenig and Horst Koehler. In the chapter "Die optischen Mikrometer" beginning on page 347 such beam splitters are shown with FIG. 357, for example disclosing offset half-lenses; FIG. 360, on the other hand, shows the application of two optical wedges. Further on page 349 is illustrated a single plane parallel glass plate and it is apparent from this illustration in which manner this plate offsets the impinging light rays in parallel if the rays impinge under an angle which is different from a right angle. It will also be obvious therefrom that if two such plates are arranged side by side in the path of the light rays and are tilted differently relative to the direction of impinging light they will offset the light beams in parallel by different amounts.

DESCRIPTION OF THE DRAWINGS

The invention will be more readily comprehensible from the following explanation when taken in conjunction with the accompanying drawings wherein by way of example a photoelectric incremental angle transducer is illustrated.

FIG. 2 shows schematically an incremental transducer having a radial grating with elements added for generating a four-phase electrical rotary field according to the invention;

FIG. 4 is similar to FIG. 2 but with the substitution of differential photoreceptors for the hemihedral mirrors.

DESCRIPTION OF THE PREFERRED EMBODIMENTS

Figure 1:
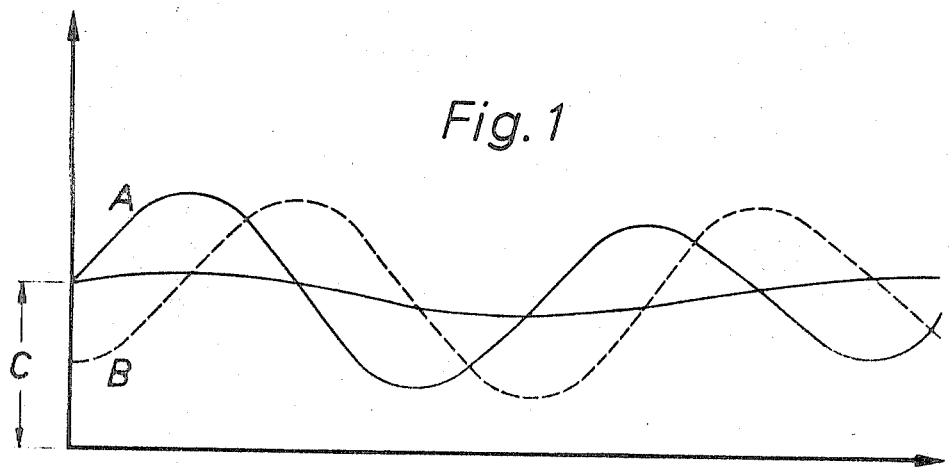
FIG. 1 is a diagram illustrating the waves of the position-defining signals.

In FIG. 1, signals are illustrated as wavy lines A and B as they are produced by the receivers of a radial or linear incremental transducer of a conventional type. These signals are formed as a DC current superimposed by an AC current. In this case C is the DC level of these signals, which level varies on account of external influences, for example due to the aging of the light source or voltage fluctuations of the voltage source employed. Accordingly, this DC level is to be stabilized, so that the external influences are not incorporated into the measured result.

In the embodiment shown in FIG. 2, a disc 11 carrying a radial grating 11' is rotatably mounted by means of a shaft 10. A lamp 12 illuminates a zone A' of the radial grating 11' via a condenser 13, as well as a deflection mirror 14. This zone A' is reproduced on the zone B' of the radial grating 11' by way of deflection mirrors 15, 16, an objective 17, a deflection mirror 18, an image doubling means in the form of a Wollaston prism 19, a deflection mirror 20, an objective 21, as well as two deflection mirrors 22, 23. Zone B' is scanned by photoelectric receivers by way of a deflection mirror 24, as well as a polarizing splitter 25. The arrangement described thus far is known as an incremental angle transducer.

However, as can be seen, two half-lenses 26, 27 are connected in front of the Wollaston prism, the separating edge of the pair of half-lenses intersecting the optic axis of the device. The half-lenses are facing each other with their sectional areas and are displaced with respect to each other with their central axes in such a manner that, in the zone B' of the radial grating 11', respectively two grating images are produced, displaced by a one-half index interval. The light of these images results from each of the half-lens respectively.

Two objectives 28, 29 are connected after the splitter 25; respectively one hemihedral mirror 30, 31 is disposed in the focal points thereof. These mirrors reflect the portions of the image beam path stemming from one of the half-lenses and convey these portions, by way of lenses 32', 34', to photoelectric receivers 32, 34, whereas the proportions of the light beam resulting from the other half-lens impinge, by way of oculars 33', 35', on photoelectric receivers 33, 35. In this case, the illumination of respectively two photoelectric receivers 32, 34, and 33, 35 then takes place in phase opposition. Thus, the electrical signals obtained at these receivers are suitable to be used to eliminate the undesired DC proportions. These signals are fed, in pairs, to push-pull amplifiers 36, 37, the symmetric outputs of which suppress the DC proportion of the signals in a conventional manner. The output signals of these push-pull amplifiers are fed to a counting direction discriminator 38 which has connected thereafter an up-down counter 39 for the digital indication of the respective measuring result.

Figure 3:
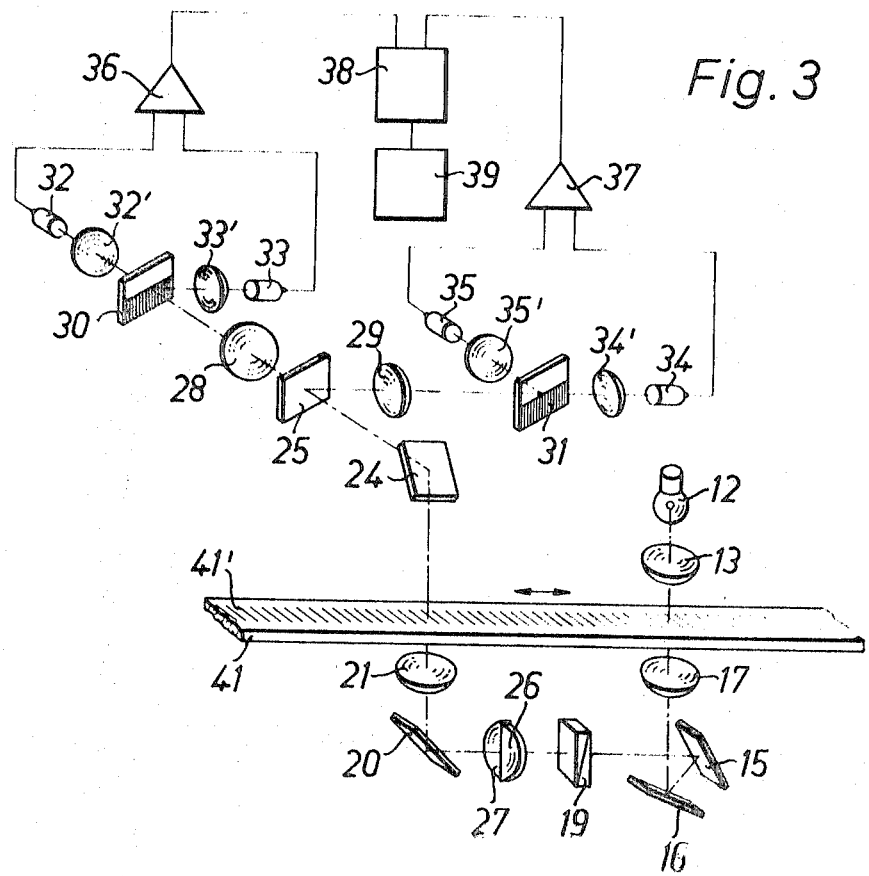
FIG. 3 is similar to FIG. 2 but with the substitution of a linear grating for the radial grating.

In the embodiment of FIG. 2, a disc having a radial grating is illustrated. The invention, however, can also be employed in connection with devices having linear gratings, i.e., in so-called linear incremental transducers, as shown in FIG. 3.

As can be seen therefrom, the above-described radial grating is replaced by a carrier 41 having a linear grating 41'. This carrier is mounted to be displaceable in the direction of its longitudinal extension, as indicated by arrows, and is connected with the object to be measured. It should also be noted that the structural components employed herein are provided with the same reference numerals as in FIG. 2.

In an alternative embodiment it is possible to replace the deflection mirror 20 by two mirrors which are slightly inclined with respect to each other, which mirrors are each associated with different portions of the image beam path. Also, differential photoreceptors can be used in place of the hemihedral mirrors, whereby, of course, the structural components 30—35' are eliminated. The specifications of these differential photoreceptors are disclosed in "Philips Technische Rundschau," edition 1958/59, No. 11 on page 345. FIG. 13 on this page shows a differential photoresistor in connection with a volume control device. Such differential photoresistors are applied in the embodiment illustrated in FIG. 4 of the present invention where they are denoted by reference numeral 43 and 44. The remaining elements of FIG. 4 are identical to those shown in FIG. 2 while the elements 30—35' of FIG. 2 are replaced by the two differential photoresistors 43 and 44.

I claim:
1. A photoelectric incremental transducer comprising:
    a grating (41',11') having an index interval, said grating being displaceable;
    a light source (12) illuminating part of said grating;
    optical means (14,23) adapted to project an image of said illuminated part of said grating onto a second part of said grating, said optical means further including:
        means (19) for doubling the light beams passing through said grating thereby polarizing each of said beams in directions normal to each other, said means (19) disposed on the opposite side of the grating from the location of said light source; and
        means (26,27) for geometrically splitting said light beams by one-half of said index interval, said means (26,27) disposed in the path of said light beams;
    a beam splitting element (25) located in the path of said light beams on the same side of the grating as said light source polarizing the image beams from said means for geometrically splitting;
    a first and a second hemihedral mirror (30,31) located in the path of said polarized image beams and reflecting the portions of said image beams;
    a first pair of photoelectric receivers (32, 33) receiving said portion of image beams from said first hemihedral mirror and generating two position-defining photoelectric current signals;
    a second pair of photoelectric receivers (34,35) receiving said portion of image beams from said second hemihedral mirror and generating two position-defining photoelectric current signals;
    two push-pull amplifiers (36,37) with high common mode rejection to which the four generated signals are conducted in pairs;
    a discriminator for determining the counting direction (38) to which the output signals of said amplifiers are conducted; and
    an up-down-counter (39) connected to said discriminator for digitally indicating the result of the measurement.
2. The photoelectric incremental transducer of claim 1, wherein said means for geometrically splitting are half-lenses offset with respect to each other with their central axes.
3. The photoelectric incremental transducer of claim 1, wherein said means for geometrically splitting is an optical wedge.
4. The photoelectric incremental transducer of claim 1, wherein said means for geometrically splitting are parallel plates, each of which picks up the image beam path only partially.
5. A photoelectric incremental transducer comprising:
    a grating (41',11') having an index interval, said grating being displaceable;
    a light source (12) illuminating part of said grating;
    optical means (14,23) adapted to project an image of said illuminated part of said grating onto a second part of said grating; said optical means further including:
        means (19) for doubling the light beams passing through said grating thereby polarizing each of said beams in directions normal to each other, said means (19) disposed on the opposite side of the grating from the location of said light source; and
        means (26,27) for geometrically splitting said light beams by one-half of said index interval, said means (26,27) disposed in the path of said light beams;
    a beam splitting element (25) located in the path of said light beams on the same side of the grating as said light source polarizing the image beams from said means for geometrically splitting;
    a first differential photoreceptor located in the path of said polarized image beams and generating two position-defining photoelectric current signals;
    a second differential photoreceptor located in the path of said polarized image beams and generating two position-defining photoelectric current signals;
    two push-pull amplifiers (36,37) with high common mode rejection to which the four generated signals are conducted in pairs;
    a discriminator for determining the counting direction (38) to which the output signals of said amplifiers are conducted; and
    an up-down-counter (39) connected to said discriminator for digitally indicating the result of the measurement.